United States Patent
Kremer et al.

(10) Patent No.: US 12,296,627 B2
(45) Date of Patent: May 13, 2025

(54) COUNTER-DEFLECTION LOAD ESTIMATION SYSTEM FOR A TIRE

(71) Applicant: The Goodyear Tire & Rubber Company, Akron, OH (US)

(72) Inventors: Rainer Kremer, Eisenach (DE); Mustafa Ali Arat, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 128 days.

(21) Appl. No.: 17/819,078

(22) Filed: Aug. 11, 2022

(65) Prior Publication Data

US 2023/0066535 A1    Mar. 2, 2023

Related U.S. Application Data

(60) Provisional application No. 63/238,336, filed on Aug. 30, 2021.

(51) Int. Cl.
*B60C 23/06*   (2006.01)
*B60C 23/04*   (2006.01)
(Continued)

(52) U.S. Cl.
CPC ........ *B60C 23/064* (2013.01); *B60C 23/0488* (2013.01); *G01M 17/02* (2013.01); *B60C 2019/004* (2013.01)

(58) Field of Classification Search
CPC .............. B60C 23/064; B60C 23/0488; B60C 2019/004; B60C 11/246; G01M 17/02
See application file for complete search history.

(56) References Cited

U.S. PATENT DOCUMENTS 4,364,267 A * 12/1982 Love, Jr. .............. G01G 19/025
73/146
7,546,764 B2 * 6/2009 Morinaga ............. B60C 23/064
73/146
(Continued)

FOREIGN PATENT DOCUMENTS

EP    2679411 A2 *  1/2014  ............. B60C 23/04
EP    2774784 A1     9/2014
(Continued)

OTHER PUBLICATIONS

WO 2010116095 A1 original and translation (Year: 2010).*
(Continued)

*Primary Examiner* — Frederick M Brushaber
(74) *Attorney, Agent, or Firm* — Edward T. Kennedy (57) ABSTRACT

A counter-deflection load estimation system for a tire is provided. The tire includes a pair of sidewalls extending to a circumferential tread and supporting a vehicle, and the vehicle includes a controlled area network bus. In the system, a sensor is mounted to the tire and measures a parameter of the tire. A counter-deflection of the tire is determined from the measured parameter, and a linear vehicle speed signal is received through the controlled area network bus. A processor is in electronic communication with the sensor and with the controlled area network bus. A load estimation module is in electronic communication with the processor, receives the linear vehicle speed signal and the counter-deflection of the tire, and determines a load on the tire.

18 Claims, 5 Drawing Sheets

(51) Int. Cl.
*G01M 17/02* (2006.01)
*B60C 19/00* (2006.01)

(56) References Cited

U.S. PATENT DOCUMENTS

| | | | | |
|---|---|---|---|---|
| 7,552,628 B2* | 6/2009 | Mancosu | ............ | B60C 23/0408 73/146 |
| 8,661,885 B1* | 3/2014 | Singh | ............ | B60C 23/0408 73/146 |
| 8,983,749 B1* | 3/2015 | Singh | ............ | B60T 8/172 701/71 |
| 9,290,069 B2* | 3/2016 | Singh | ............ | B60W 40/076 |
| 9,874,496 B2* | 1/2018 | Singh | ............ | B60C 23/064 |
| 11,298,991 B2* | 4/2022 | Singh | ............ | B60C 23/04 |
| 11,945,266 B2* | 4/2024 | Steiner | ............ | B60C 23/061 |
| 2003/0010108 A1* | 1/2003 | Goslar | ............ | G01B 7/16 73/146 |
| 2005/0097949 A1* | 5/2005 | Hillenmayer | ............ | B60T 8/1725 73/146 |
| 2008/0103659 A1* | 5/2008 | Mancosu | ............ | B60W 40/101 701/41 |
| 2008/0190187 A1* | 8/2008 | Bertrand | ............ | B60T 8/1725 73/146 |
| 2009/0055040 A1* | 2/2009 | Nagaya | ............ | B60T 8/1725 701/31.4 |
| 2010/0198527 A1* | 8/2010 | Gouriet | ............ | B60G 17/0182 702/33 |
| 2011/0199201 A1* | 8/2011 | Brusarosco | ............ | B60T 8/1725 340/438 |
| 2015/0217607 A1* | 8/2015 | Singh | ............ | B60C 23/0488 73/146.3 |
| 2017/0355234 A1* | 12/2017 | Dharamshi | ............ | B60C 23/0408 |
| 2020/0250899 A1* | 8/2020 | Sakakibara | ............ | B60T 8/1725 |

FOREIGN PATENT DOCUMENTS

| | | | |
|---|---|---|---|
| WO | WO-2010116095 A1 * | 10/2010 | ............ B60C 23/06 |
| WO | 2011054363 A1 | 5/2011 | |

OTHER PUBLICATIONS

WO 2020022163 A1 original and translation (Year: 2020).*
Search Report for corresponding European application received by Applicant on Feb. 17, 2023.

* cited by examiner

COUNTER-DEFLECTION LOAD ESTIMATION SYSTEM FOR A TIRE

FIELD OF THE INVENTION

The invention relates generally to tire monitoring systems. More particularly, the invention relates to systems that collect tire parameter data. The invention is directed to a system for estimating tire load that employs counter-deflection of the tire to indirectly estimate tire load in an accurate and reliable manner.

BACKGROUND OF THE INVENTION

The load on each tire of a vehicle plays an important role in vehicle factors such as handling, safety, reliability, and performance. Measurement or estimation of the load on a tire during the operation of a vehicle is often used by vehicle control systems such as braking, traction, stability, and suspension systems. For instance, information about individual tire loads enables precise estimation of the load distribution between the front and the rear axle of the vehicle, which can then be used to optimize the brake control system. Alternatively, knowledge of tire loads and consequently the vehicle mass may enable more accurate estimation of the remaining range of an electric vehicle. Thus, it is desirable to estimate the load on a tire in an accurate and reliable manner for input or use in such systems.

Prior art approaches have involved attempts at directly measuring tire load using load or strain sensors. Such direct-measurement techniques have experienced disadvantages due to the difficulty in achieving a sensor with a construction and placement on the tire that enables accurate and consistent measurement of tire load, particularly over the life of a tire.

Other prior art approaches have been developed that involve estimation of tire load using fixed parameters. Such prior art approaches have experienced disadvantages since techniques relying upon fixed parameters often lead to less-than-optimum predictions or estimations, which in turn reduces the accuracy and/or reliability of the tire load predictions.

As a result, there is a need in the art for a system and method that accurately and reliably estimates tire load.

SUMMARY OF THE INVENTION

According to an aspect of an exemplary embodiment of the invention, a counter-deflection load estimation system for a tire is provided. The tire includes a pair of sidewalls extending to a circumferential tread and supporting a vehicle, and the vehicle includes a controlled area network bus. The system includes a sensor that is mounted to the tire and measures a parameter of the tire. A counter-deflection of the tire is determined from the measured parameter, and a linear vehicle speed signal is received through the controlled area network bus. A processor is in electronic communication with the sensor and with the controlled area network bus. A load estimation module is in electronic communication with the processor, receives the linear vehicle speed signal and the counter-deflection of the tire, and determines a load on the tire.

According to another aspect of an exemplary embodiment of the invention, a method for estimating the load of a tire using counter-deflection is provided. The tire includes a pair of sidewalls extending to a circumferential tread and supporting a vehicle. In the method, a sensor is mounted to the tire, and a parameter of the tire is measured with the sensor. A counter-deflection of the tire is determined from the measured parameter, and a linear vehicle speed signal is received through a controlled area network bus of the vehicle. A processor is provided in electronic communication with the sensor and with the controlled area network bus. The linear vehicle speed signal and the counter-deflection of the tire are receiving in a load estimation module that is in electronic communication with the processor. A load on the tire is determined with the load estimation module.

BRIEF DESCRIPTION OF THE DRAWINGS

The invention will be described by way of example and with reference to the accompanying drawings, in which.

Similar numerals refer to similar parts throughout the drawings.

Definitions

"Axial" and "axially" means lines or directions that are parallel to the axis of rotation of the tire.

"CAN bus" is an abbreviation for controller area network, which is a vehicle bus standard designed to allow microcontrollers and devices to communicate with each other within a vehicle without a host computer. CAN bus is a message-based protocol, designed specifically for vehicle applications.

"Circumferential" means lines or directions extending along the perimeter of the surface of the annular tread perpendicular to the axial direction.

"Equatorial Centerplane" means the plane perpendicular to the tire's axis of rotation and passing through the center of the tread.

"Footprint" means the contact patch or area of contact created by the tire tread with a flat surface, such as the ground, as the tire rotates or rolls.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Tread element" or "traction element" means a rib or a block element defined by a shape having adjacent grooves.

DETAILED DESCRIPTION OF THE INVENTION

An exemplary embodiment of the counter-deflection tire load estimation system of the present invention is indicated at 10 in FIGS. 1 through 5. The system 10 and accompanying method attempt to overcome the above-described challenges posed by prior art systems and methods that seek to measure the tire load through direct sensor measurements. As such, the subject system and method is referred herein as an "indirect" load estimation system and method.

Figure 1:
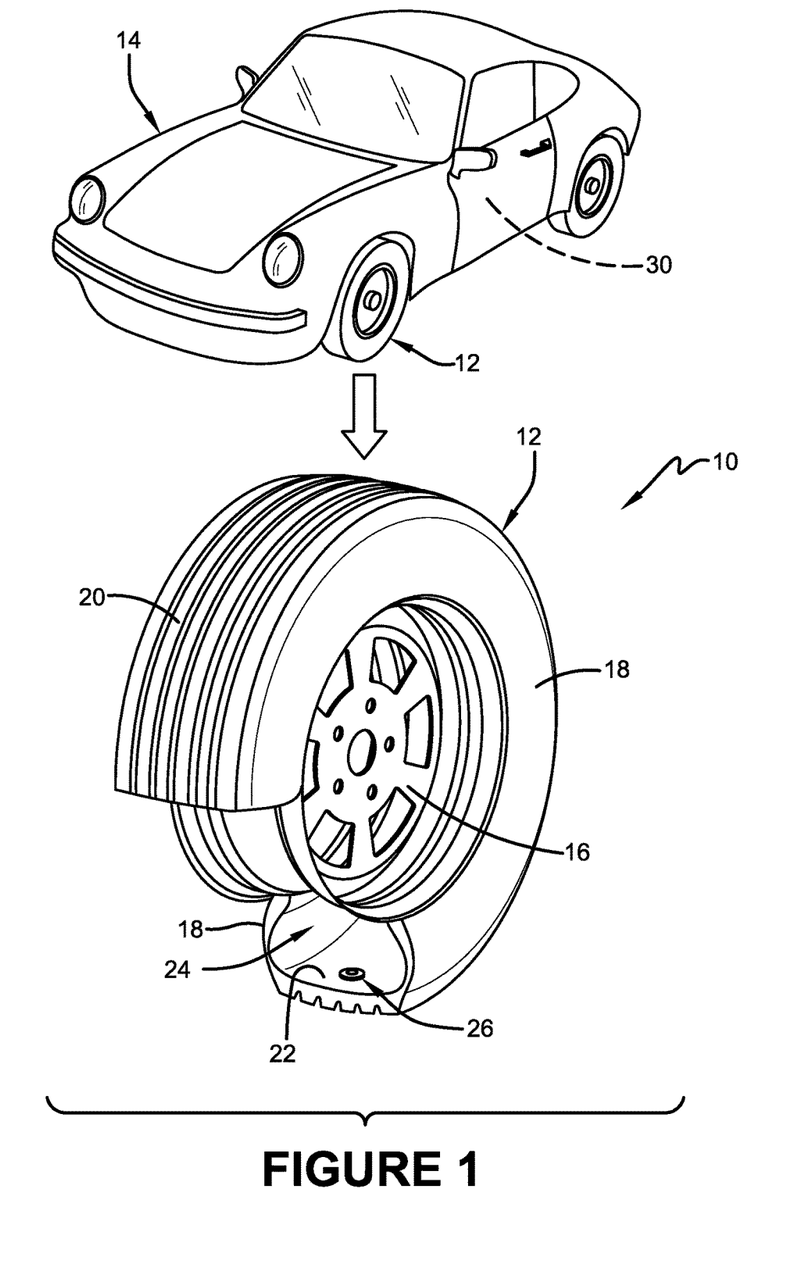
FIG. 1 is a perspective view of a vehicle and sensor-equipped tire employing an exemplary embodiment of the counter-deflection tire load estimation system of the present invention.

With particular reference to FIG. 1, the system 10 estimates the load on each tire 12 supporting a vehicle 14 based on counter-deflection of the tire, as will be described in greater detail below. While the vehicle 14 is depicted as a passenger car, the invention is not to be so restricted. The principles of the invention find application in other vehicle categories such as commercial trucks in which vehicles may be supported by more or fewer tires than shown in FIG. 1. For the purpose of convenience, analysis of a single tire 12 will be made except as specifically described below, with the understanding that a similar analysis is contemplated for each tire supporting the vehicle 14.

The tire 12 is of conventional construction and is mounted on a respective wheel 16. The tire 12 includes a pair of sidewalls 18 that extend to a circumferential tread 20, which engages the ground during vehicle operation. The tire 12 preferably is equipped with a sensor 26 that is mounted to the tire for the purpose of detecting certain real-time tire parameters. For example, the sensor 26 may be a commercially-available tire pressure monitoring system (TPMS) module or sensor, which may be affixed to an inner liner 22 of the tire 12 by suitable means such as adhesive. The sensor 26 preferably includes a pressure sensor to sense an inflation pressure 58 (FIG. 4) within a cavity 24 of the tire 12, and a temperature sensor to sense a temperature 60 of the tire and/or the temperature in the cavity. The sensor 26 preferably also senses a revolution time of the tire 12, and also senses counter deflection of the tire, as will be explained in greater detail below.

The sensor 26 preferably also includes a processor and memory to store tire identification (tire ID) information 66 (FIG. 4) for the tire 12. For example, the tire ID may include manufacturing information for the tire 12, including: the location of the tire on the vehicle 14; the tire model; size information, such as rim size, width, and outer diameter; manufacturing location; manufacturing date; a treadcap code that includes or correlates to a compound identification; and a mold code that includes or correlates to a tread structure identification. The tire ID may also include a service history or other information to identify specific features and parameters of the tire 12. The sensor 26 preferably further includes an antenna for transmitting measured parameters and tire ID data to a remote processor 28, which may be a processor that is integrated into a vehicle CAN bus 30, for analysis.

Aspects of the tire load estimation system 10 preferably are executed on a processor 28 (FIG. 4) that is accessible through the vehicle CAN bus 30. The processor 28 may be a vehicle-mounted processor, or may be a remote Internet or cloud-based processor (FIG. 5). Use of such a processor 28, and accompanying memory, enables input of data into the system 10 from the tire-based sensor 26 and data from certain vehicle-based sensors, as well as data from a database that may be stored in a suitable storage medium which is in electronic communication with the processor. The CAN bus 30 enables the tire load estimation system 10 to interface with other electronic components and systems of the vehicle 14.

Figure 2:
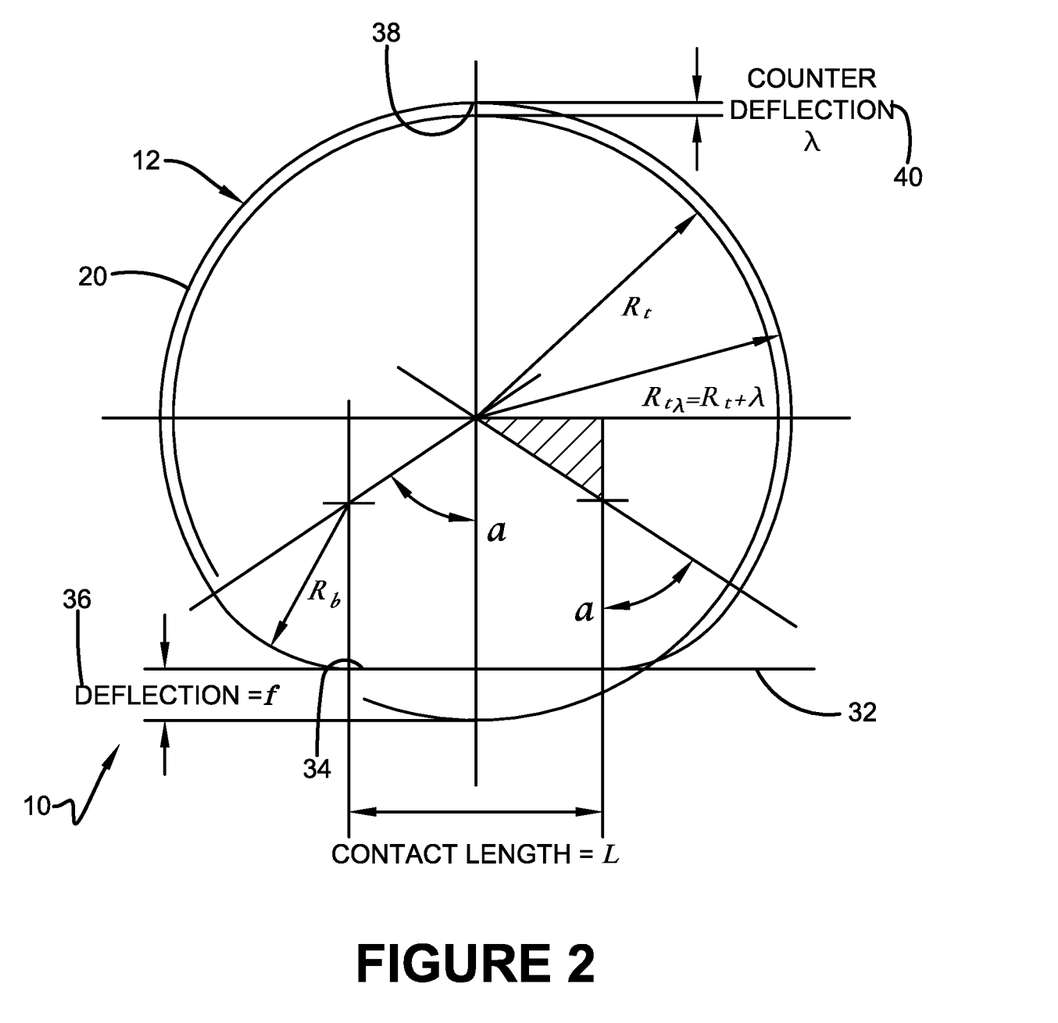
FIG. 2 is a schematic representation showing counter-deflection of the tire shown in FIG. 1.

Turning to FIG. 2, as the tire 12 rotates or rolls on a surface 32 such as the ground, the tread 20 creates a contact patch 34 with the surface, which is also known as a footprint. In the contact patch 34, the tire 12 experiences a deflection 36. Due to the deflection 36, a surface 38 of the tire 12 outside of the contact patch 34 experiences a counter-deflection 40. More particularly, the counter-deflection 40 is an increase in a radius of the tire 12 away from the contact patch 34, and is proportional to the deflection 36 that occurs in the contact patch.

Figure 3:
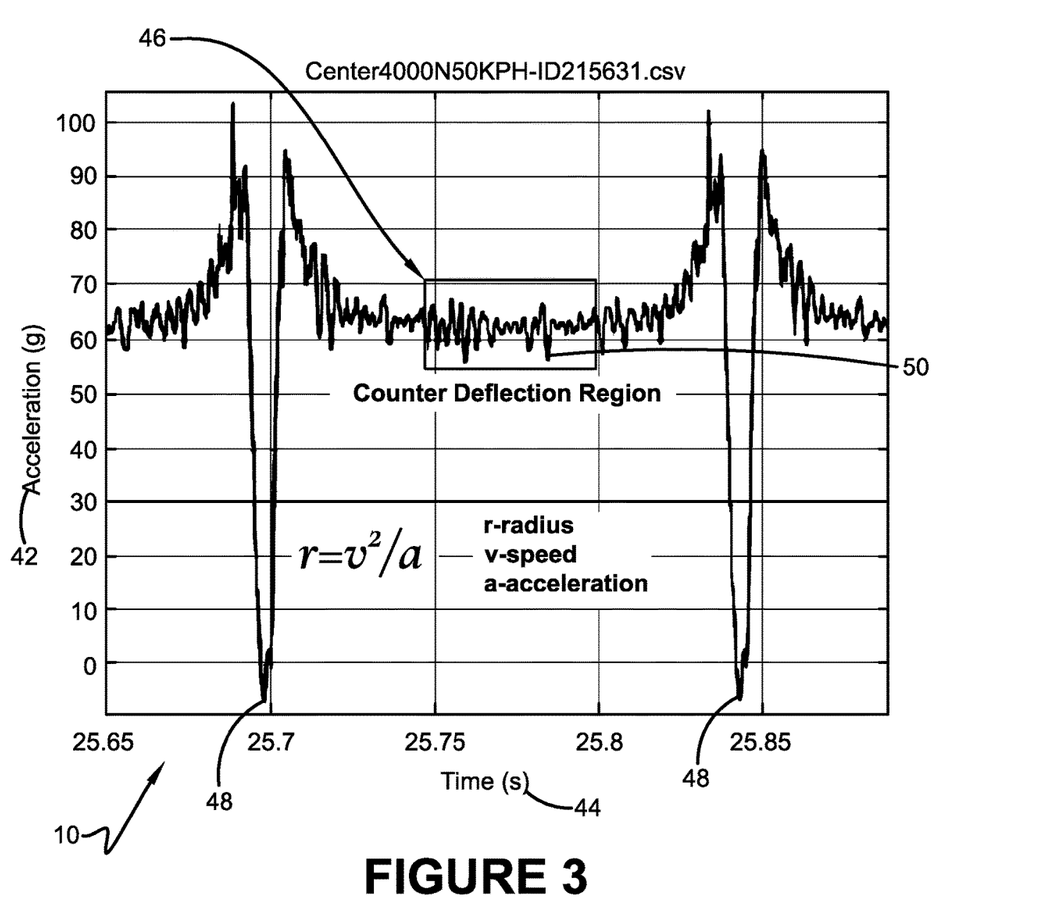
FIG. 3 is a graphical representation of radial acceleration of the tire shown in FIG. 2.

With additional reference to FIG. 3, as the tire 12 rotates, it exhibits radial acceleration 42. The radial acceleration 42 of the tire 12 may be plotted over time 44, and when the vehicle 14 is traveling at a constant speed, a mid-region 46 between radial acceleration minimums 48 corresponds to the counter-deflection 40 of the tire. A mean value 50 for the radial acceleration mid-region 46 may be determined, which corresponds to a specific value for the counter-deflection 40, as will be described in greater detail below. In this example, the mean value 50 for the radial acceleration mid-region 46 is about 62 g, where g is a gravitational force equivalent. The radial acceleration mean value 50 corresponds to a counter-deflection 40 or a counter-deflected radius of about 0.317 meters (M) for the tire 12 under a load of 4,000 newtons (N) at a speed of 50 kilometers per hour (kph).

The sensor 26 (FIG. 1) may include a radial accelerometer to sense the radial acceleration 42 of the tire 12, from which the counter-deflection 40 may be determined. The determination of counter-deflection 40 of the tire 12 from the radial acceleration 42 may be performed within the sensor 26, or in the processor 28, as the processor is in electronic communication with the sensor. It is to be understood that other measuring devices which measure deformation of the tire 12 may be employed to determine counter-deflection 40.

Figure 4:
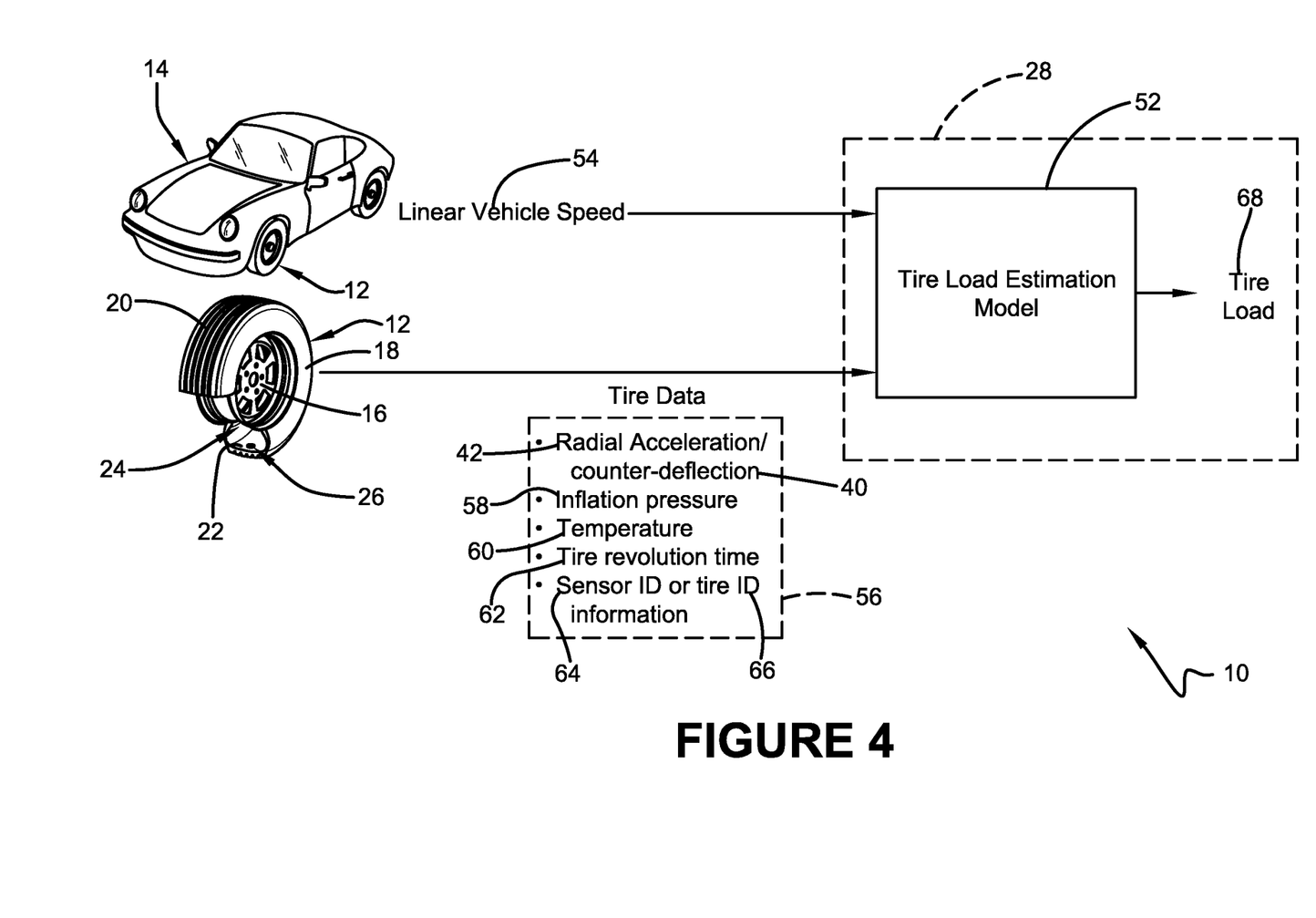
FIG. 4 is a schematic representation of an exemplary embodiment of the counter-deflection tire load estimation system of the present invention.
Figure 5:
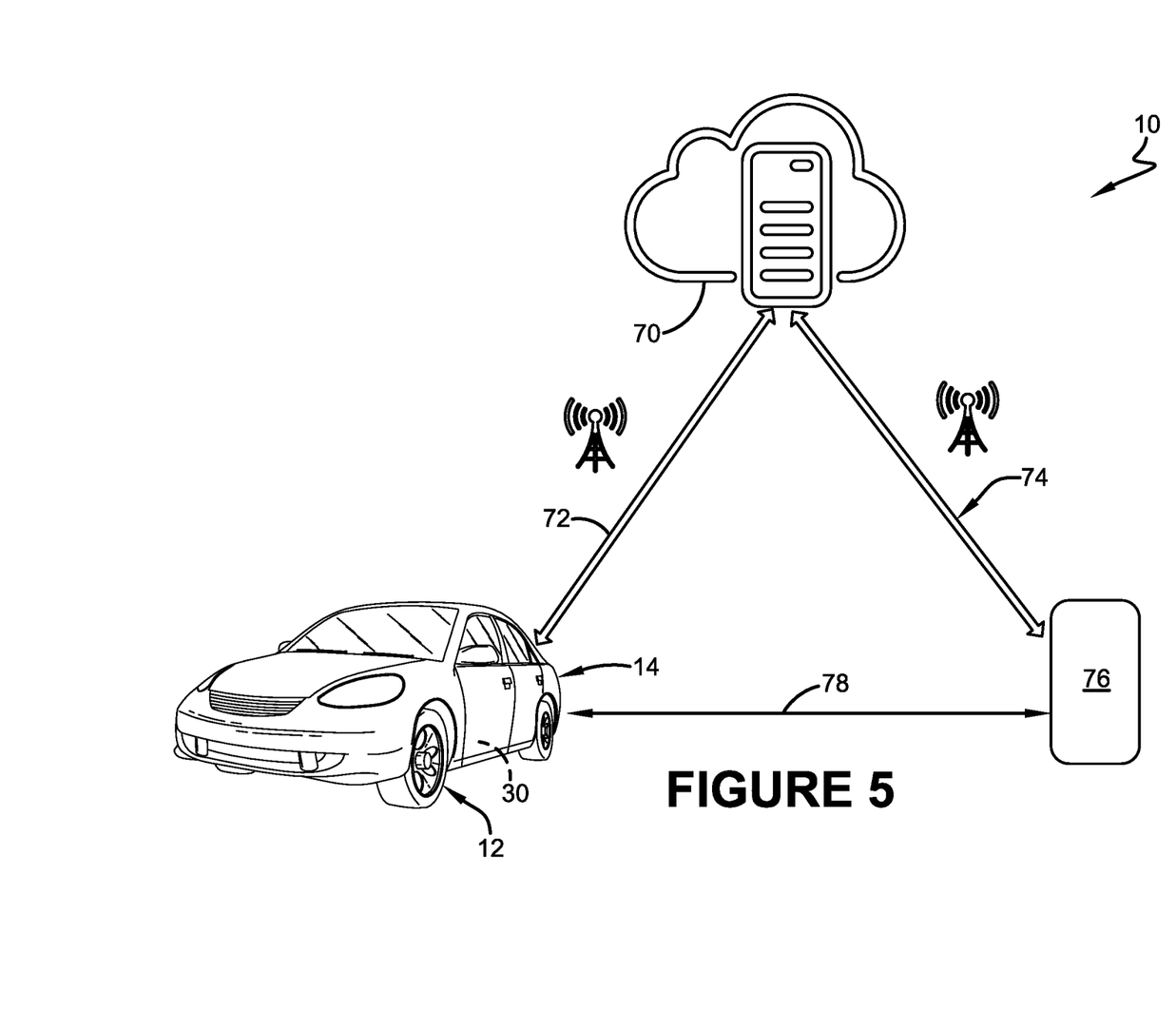
FIG. 5 is a schematic diagram of the vehicle shown in FIG. 1 with a representation of data transmission to a cloud-based server and to a user device.

Turning to FIG. 4, the counter-deflection tire load estimation system 10 includes a load estimation module or model 52, which is stored on or is in electronic communication with the processor 28. The load estimation module 52 receives a linear vehicle speed 54 through the vehicle CAN bus 30, and tire data 56 from the sensor 26. The tire data 56 preferably includes the radial acceleration 42 of the tire 12, from which the counter-deflection 40 may be determined, or another tire parameter that enables the determination of the counter deflection. The tire data 56 also preferably includes a revolution time 62 of the tire 12 to enable determination of the radial acceleration mid-region 46, and thus the counter-deflection 40. The tire data 56 preferably also includes the tire inflation pressure 58, the tire temperature 60, the tire ID information 66, and/or an identification code 64 for the sensor 26.

The load estimation module 52 preferably includes a regression model, which may be a linear regression model or a nonlinear regression model, to estimate a tire load 68 from the linear vehicle speed 54 and the tire data 56, including the counter-deflection 40. Preferably, a linear regression model is employed. However, if greater accuracy in the load estimation model 52 is desired, a nonlinear regression model may be employed.

By way of example, the tire 12 includes a vertical stiffness Kf, which is a proportionality constant between the deflection 36 (also indicated as f) and a normal load F on the tire:

$$F=Kf*f$$

A counter-deflection stiffness Kλ of the tire 12 is a proportionality constant between the counter-deflection 40 (also indicated as λ) and the normal load F:

$$F=K\lambda*\lambda$$

The counter-deflection stiffness Kλ is directly proportional to a vertical stiffness of the tire 12. The counter-deflection stiffness Kλ may be described as a regression model with a first variable, indicated as m, which is proportional to the inflation pressure 58 (also indicated as p), and a second variable, indicated as b, which represents structural characteristics of the tire 12 identified from the tire ID information 66, such as a sidewall shear stiffness and a size of the tire:

$$K\lambda=m*p+b$$

The counter-deflection 40 (λ) may be determined using a counter-deflected radius r of the tire 12, subtracting an unloaded tire radius ro:

$$\lambda=r-ro$$

The radius r, as obtained from the measured radial acceleration 42 (also indicated as a), is equivalent to the square of the linear vehicle speed 54 (also indicated as v) divided by the radial acceleration:

$$r=\frac{v^2}{a}$$

The counter-deflection 40 (λ) is thus determined as:

$$\lambda=\frac{v^2}{a}-ro$$

From this, the tire load 68 (also indicated as F), is determined:

$$F=(m*p+b)*\left(\frac{v^2}{a}-ro\right)$$

Which may also be generally expressed as F=f(p, ro, v, a).

In this manner, the load estimation module 52 estimates the tire load 68 from the linear vehicle speed 54 and the tire data 56. The estimated load 68 on the tire 12 may be communicated through the vehicle CAN bus system 30 from the counter-deflection tire load estimation system 10 for use by a vehicle control system, such as a braking, traction, stability, and/or suspension system.

Turning to FIG. 5, the counter-deflection tire load estimation system 10 preferably is executed on a processor 28 that is accessible through the vehicle CAN bus 30, which may be mounted on the vehicle 14, or which may be in an Internet or cloud-based computing system 70, referred to herein as a cloud-based computing system. The counter-deflection tire load estimation system 10 preferably employs wireless data transmission 72 between the vehicle 14 and the cloud-based computing system 70. The counter-deflection tire load estimation system 10 may also employ wireless data transmission 74 between the cloud-based computing system 70 and a display device 76 that is accessible to a user of the vehicle 14, such as a smartphone, or to a fleet manager. Alternatively, the system 10 may also employ wireless data transmission 78 between the vehicle CAN bus 30 and the display device 76.

In this manner, the counter-deflection tire load estimation system 10 of the present invention indirectly estimates tire load 68 in an accurate and reliable manner using counter-deflection 40 of the tire 12. The counter-deflection tire load estimation system 10 employs the linear vehicle speed 54 and the tire data 56 for a real-time estimation of the tire load 68.

The present invention also includes a method for estimating the load of a tire 12. The method includes steps in accordance with the description that is presented above and shown in FIGS. 1 through 5.

It is to be understood that the structure and method of the above-described counter-deflection tire load estimation system may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A counter-deflection load estimation system for a tire, the tire including a pair of sidewalls extending to a circumferential tread and supporting a vehicle, the vehicle including a controlled area network bus, the system comprising:
    a sensor being mounted to the tire, the sensor measuring a parameter of the tire;
    a counter-deflection of the tire being determined from the measured parameter, the counter-deflection being an increase in a radius of the tire away from a contact patch of the tire with a surface on which the tire rolls;
    a linear vehicle speed signal received through the controlled area network bus;
    a processor in electronic communication with the sensor and with the controlled area network bus;
    the processor being configured to execute a load estimation module, the load estimation module receiving the linear vehicle speed signal and the counter-deflection of the tire and determining a load on the tire; and
    a vehicle control system in electronic communication with the processor, the vehicle control system receiving the determined load on the tire for actuation of the vehicle control system in response to the load on the tire.

2. The counter-deflection load estimation system for a tire of claim 1, wherein the measured parameter includes a radial acceleration of the tire.

3. The counter-deflection load estimation system for a tire of claim 2, wherein the counter-deflection is determined from a mid-region between radial acceleration minimums.

4. The counter-deflection load estimation system for a tire of claim 3, wherein the counter-deflection is determined from a mean value for the radial acceleration in the mid-region.

5. The counter-deflection load estimation system for a tire of claim 2, wherein the load estimation module receives a revolution time of the tire as measured by the sensor.

6. The counter-deflection load estimation system for a tire of claim 2, wherein the load estimation module receives an inflation pressure of the tire and a temperature of the tire as measured by the sensor.

7. The counter-deflection load estimation system for a tire of claim 2, wherein the load estimation module receives at least one of tire identification information and an identification code for the sensor.

8. The counter-deflection load estimation system for a tire of claim 1, wherein the load estimation module receives the linear vehicle speed from the controlled area network bus.

9. The counter-deflection load estimation system for a tire of claim 1, wherein the load estimation module employs a regression model.

10. The counter-deflection load estimation system for a tire of claim 9, wherein the regression model includes a linear regression model.

11. The counter-deflection load estimation system for a tire of claim 1, wherein the processor includes at least one of a vehicle-mounted processor and a processor in a cloud-based computing system.

12. A method for estimating the load of a tire, the tire including a pair of sidewalls extending to a circumferential tread and supporting a vehicle, the method comprising the steps of:
mounting a sensor to the tire;
measuring a parameter of the tire with the sensor;
determining a counter-deflection of the tire from the measured parameter, the counter-deflection being an increase in a radius of the tire away from a contact patch of the tire with a surface on which the tire rolls;
receiving a linear vehicle speed signal through a controlled area network bus of the vehicle;
providing a processor in electronic communication with the sensor and with the controlled area network bus;
configuring the processor to receive the linear vehicle speed signal and the counter-deflection of the tire in a load estimation module;
determining a load on the tire with the load estimation module;
transmitting the determined load on the tire to a vehicle control system that is in electronic communication with the processor; and
actuating the vehicle control system in response to the load on the tire.

13. The method for estimating the load of a tire of claim 12, wherein the step of measuring a parameter of the tire includes measuring a radial acceleration of the tire.

14. The method for estimating the load of a tire of claim 13, wherein the step of determining a counter-deflection of the tire includes determining the counter-deflection from a mid-region between radial acceleration minimums.

15. The method for estimating the load of a tire of claim 14, wherein the step of determining a counter-deflection of the tire includes determining the counter-deflection from a mean value for the radial acceleration in the mid-region.

16. The method for estimating the load of a tire of claim 13, further comprising the step of receiving in the load estimation module a revolution time of the tire as measured by the sensor and at least one of an inflation pressure of the tire and a temperature of the tire as measured by the sensor.

17. The method for estimating the load of a tire of claim 13, further comprising the step of receiving in the load estimation module at least one of tire identification information and an identification code for the sensor.

18. The method for estimating the load of a tire of claim 12, wherein the step of determining a load on the tire with the load estimation module includes employing a linear regression model.

* * * * *